US011480263B2

(12) United States Patent
Wang et al.

(10) Patent No.: US 11,480,263 B2
(45) Date of Patent: Oct. 25, 2022

(54) MAGNETICALLY CONTROLLED MATERIAL-BASED MAGNETORHEOLOGICAL PILOT OPERATED SAFETY VALVE FOR HYDRAULIC SUPPORT, AND APPLICATIONS OF THE SAME

(71) Applicant: SHANDONG UNIVERSITY OF SCIENCE AND TECHNOLOGY, Qingdao (CN)

(72) Inventors: Chenglong Wang, Qingdao (CN); Genyuan Miao, Qingdao (CN); Yifang Chen, Qingdao (CN); Xueting Wang, Qingdao (CN); Meng Chen, Qingdao (CN); Qingliang Zeng, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 17/435,704

(22) PCT Filed: May 7, 2020

(86) PCT No.: PCT/CN2020/088976
§ 371 (c)(1),
(2) Date: Sep. 2, 2021

(87) PCT Pub. No.: WO2021/031621
PCT Pub. Date: Feb. 25, 2021

(65) Prior Publication Data
US 2022/0090697 A1  Mar. 24, 2022

(30) Foreign Application Priority Data

Dec. 12, 2019 (CN) .......................... 201911272562.0

(51) Int. Cl.
*F16K 31/42* (2006.01)
*E21D 23/00* (2006.01)
(Continued)

(52) U.S. Cl.
CPC ............ *F16K 31/42* (2013.01); *E21D 23/006* (2013.01); *E21D 23/26* (2013.01); *F16K 37/00* (2013.01); *H02K 33/02* (2013.01)

(58) Field of Classification Search
USPC ....................................... 267/140.14, 140.15
See application file for complete search history.

(56) References Cited

U.S. PATENT DOCUMENTS 3,778,697 A * 12/1973 Link ...................... H02K 33/02
322/3
2009/0178397 A1   7/2009 Mankame et al.

FOREIGN PATENT DOCUMENTS

CN        103953369 A     7/2014
CN        104633233 A     5/2015
(Continued)

*Primary Examiner* — Daphne M Barry
(74) *Attorney, Agent, or Firm* — PROI Intellectual Property US; Klaus Michael Schmid

(57) ABSTRACT

Disclosed is a magnetically controlled material-based magnetorheological pilot operated safety valve for a hydraulic support. The safety valve comprises a valve body, a valve core, a reset spring, and a pilot valve; the valve core is disposed in a valve core chamber provided in the valve body, and the pilot valve is disposed in a pilot valve chamber provided in the valve body; the pilot valve includes a magnetically controlled shape memory alloy, an electromagnet, a push rod, a piston, a magnetorheological fluid control coil, and a pilot valve core, which are arranged sequentially from left to right; a plurality of magnetically controlled material control coils are provided on the electromagnet; the magnetically controlled shape memory alloy runs through the electromagnet and is then connected to the push rod, the (Continued)

push rod is connected to the piston, the magnetorheological fluid lies between the piston and the pilot valve core.

9 Claims, 5 Drawing Sheets

(51) Int. Cl.
*E21D 23/26* (2006.01)
*F16K 37/00* (2006.01)
*H02K 33/02* (2006.01)

(56) References Cited

FOREIGN PATENT DOCUMENTS

| | | | | |
|---|---|---|---|---|
| CN | 106168306 A | | 11/2016 | |
| CN | 206496055 U | | 9/2017 | |
| CN | 206496071 U | | 9/2017 | |
| CN | 107725083 A | | 2/2018 | |
| CN | 110905576 A | | 3/2020 | |
| GB | 2469298 A | * | 10/2010 | ........... F16K 31/025 |

* cited by examiner

MAGNETICALLY CONTROLLED MATERIAL-BASED MAGNETORHEOLOGICAL PILOT OPERATED SAFETY VALVE FOR HYDRAULIC SUPPORT, AND APPLICATIONS OF THE SAME

FIELD

Embodiments of the present disclosure generally relate to valve technologies, and more particularly relate to a magnetically controlled material-based magnetorheological pilot operated safety valve for a hydraulic support and applications of the same.

BACKGROUND

As the shallow underground coal resources become increasingly depleted, it is inevitable for coal mining to go deeper and deeper, consequences of which include abrupt increase of coal mine working face supporting pressure and frequent occurrence of rockburst. To handle the above problems, conventional coal mine hydraulic supports generally adopt a high flow safety valve. However, in practical applications, it has been found that the high flow safety valve cannot respond timely to rockburst, causing damages to the hydraulic support structure, even personal casualties. Through field survey and theoretical analysis, researchers have found that the rockburst acts upon the hydraulic support column in a very short time, while it takes certain time for the rockburst acted on the support to be transmitted to the valve core of the high flow safety valve via the fluid in upper and lower cavities of the column, and it takes further certain time for the valve core to overcome spring action, such that the aggregate time exceeds the action time of the rockburst and the impact energy fail to be timely unloaded, which is the main cause of failure of the high flow safety valve to act when rockburst occurs. The enormous impact energy which is released through deformation of the hydraulic support causes structural damage, deformation and instability to the hydraulic support, leading to coal mine safety lapses. The Chinese patents No. CN107725083A and CN103953369A disclose a hydraulic support safety valve resetting method, which uses nitrogen to reset a valve core, wherein compared with conventional safety valves which use a spring to reset, use of nitrogen as the elastic material to reset the valve core offers a higher response speed. However, the compressed gas as an elastomer also has an elastic modulus, and there is still room for response speed improvement.

To address the response time deficiency of conventional hydraulic support safety valves, the present disclosure provides a magnetically controlled material-based pilot operated safety valve for a hydraulic support. The safety valve as described herein employs an electric control part to control a magnetically controlled shape memory alloy and a magnetorheological fluid to thereby overcome the excessively long hydraulic impact transmission time and spring response time of conventional safety valves.

SUMMARY

To address the above and other drawbacks in conventional technologies, embodiments of the present disclosure provide a magnetically controlled material-based magnetorheological pilot operated safety valve for a hydraulic support.

Embodiments of the present disclosure further provide an operating method for the magnetically controlled material-based magnetorheological pilot operated safety valve for a hydraulic support.

Technical Solutions of the Present Disclosure are Provided Below

A magnetically controlled material-based magnetorheological pilot operated safety valve for a hydraulic support, comprising a valve body, a valve core, a reset spring, and a pilot valve; wherein the valve core is disposed in a valve core chamber provided in the valve body, the pilot valve is disposed in a pilot valve chamber provided in the valve body, the reset spring is disposed in a spring chamber provided at the top end of the valve core and in a spring chamber provided in the valve body, the pilot valve chamber and the valve core chamber communicate therebetween via two control oil flow passageways, a magnetorheological fluid is filled in the pilot valve chamber, and an emulsion is filled in the valve core chamber;

the pilot valve includes a magnetically controlled shape memory alloy, an electromagnet, a push rod, a piston, a magnetorheological fluid control coil, and a pilot valve core, which are arranged sequentially from left to right; a plurality of magnetically controlled material control coils are provided on the electromagnet; the magnetically controlled shape memory alloy runs through the electromagnet, a front end of the magnetically controlled shape memory alloy is connected to the push rod, the push rod is connected to the piston, the magnetorheological fluid lies between the piston and the pilot valve core, and a damping hole is provided in the axial direction of the magnetorheological fluid control coil.

Preferably, the valve body comprises a housing, a valve seat, an end cap, and a plug; the housing is disposed on the valve seat, a fluid inlet being provided in the housing and communicating with the valve core chamber; the valve core chamber is disposed in a vertical direction of the housing, and the pilot valve chamber is disposed in a horizontal direction in the housing; one end of the pilot valve chamber is enclosed by a pilot valve end cap, and the other end is enclosed by the plug; the bottom of the valve seat is enclosed by the end cap; and a bleed port communicating with the valve core chamber is provided on the valve seat.

Preferably, the valve core has a cross-shaped appearance, one of the spring chambers is provided at the top end of the valve core, and two through control oil flow passageways are provided in the axial direction of the valve core.

Preferably, the bottom end of the valve core is provided as a conical body, such that when the valve core descends, the conical body may block the bleed port on the valve seat.

Preferably, the pilot valve end cap is provided with a fine adjusting screw, the fine adjusting screw contacting a terminal end of the magnetically controlled shape memory alloy.

Preferably, a displacement sensor is provided in the pilot valve chamber, the displacement sensor being disposed at the piston side.

Preferably, the pilot chamber is a step chamber, including a big compartment and a small compartment, the two control oil flow passageways respectively communicating with the big compartment and the small compartment; one end of the pilot valve core is provided as a conical body, the pilot valve core being disposed in the big compartment, such that when the pilot valve core moves, the conical body may block the small compartment.

Preferably, the reset spring selects a Belleville spring, a rubber spring, or a gas spring.

Preferably, the bottom of the housing is in threaded connection with the valve seat.

Embodiments of the present disclosure provide an operating method of a magnetically controlled material-based magnetorheological pilot operated safety valve for a hydraulic support, the safety valve being pre-mounted on an oil circuit for controlling a column of the hydraulic support; then a pressure pickup and a controller disposed in a middle cylinder of the column being connected to the safety valve; under the control of a controller, a magnetorheological fluid control coil and a magnetically controlled material control coil of the safety valve being currently in an energized state, the magnetorheological fluid being in a non-Newtonian fluid state, the magnetically controlled shape memory alloy being in a rightward elongated state; wherein when the column is subjected to an impact pressure, the operating method of the safety valve comprises steps as follows:

(1) the pressure pickup detects a column impacted signal and transmits the column impacted signal to the controller;

(2) the controller analyzes the impact pressure value, and compares the impact pressure value with a preset value, so as to determine whether the difference is within a pressure range setting;

(3) when the difference is less than the pressure range setting, the controller determines that the hydraulic support operates within a normal pressure range, and energizes the magnetorheological fluid control coil and the magnetically controlled material control coil according to set parameters; because the magnetorheological fluid is in the non-Newtonian fluid state and disposed at the right side of the magnetorheological fluid control coil, the pilot valve core currently does not act, and the safety valve is in a closed state;

or, when the difference is greater than the pressure range setting, the controller controls the magnetorheological fluid control coil to be deenergized and the magnetically controlled material control coil to be reversely energized, wherein the magnetically controlled shape memory alloy retracts leftward, the magnetorheological fluid changes to a Newtonian fluid state and flows towards the left side of the magnetorheological fluid control coil, the pilot valve core moves leftward, the safety valve is opened, the emulsion at the upper portion of the valve core flows through the pilot valve chamber and the control oil flow passageway on the valve core back to an emulsion pump station; at this moment, under the pressure action of the emulsion in the lower portion of the valve core, the valve core overcomes the pressure of the reset spring to move upwards, the valve core is opened, and the emulsion in the column flows via a fluid inlet and a bleed port back to the pump station;

(4) when the pressure pickup detects that the pressure in the middle cylinder drops below the pressure range setting, the controller determines that the safety valve has completed bleeding; then, the controller controls the magnetically controlled material control coil to be reversely energized for the second time, wherein the magnetically controlled shape memory alloy is elongated rightward to push the piston to move rightward; the piston squeezes the magnetorheological fluid to the right side of the magnetorheological fluid control coil to close the pilot valve core;

(5) when the piston reaches the rightmost end, the displacement sensor detects a change of piston position and transmits the position signal to the controller, wherein the controller controls the magnetorheological fluid control coil to be energized to change the magnetorheological fluid to the non-Newtonian fluid state;

(6) under the action of the reset spring, the valve core moves downwards such that the conical body at the bottom of the valve core blocks the bleed port on the valve seat, thereby completing safety valve reset.

The present disclosure has the following advantageous effects:

1. Relevant documents and field surveys indicate that when a hydraulic support is subjected to an impact load, the middle cylinder receives the highest hydraulic pressure. Therefore, by arranging a combination of pressure pickup and controller in the middle cylinder of the hydraulic support to detect the transmitted pressure signal and analyze the pressure value so as to control operation of the pilot valve, the safety valve according to the present disclosure enables reduction of the hydraulic system' response time for transmitting a pressure signal, compared with conventional safety valves.

2. The safety valve according to the present disclosure uses a magnetorheological fluid to control the action of the pilot valve core, instead of spring control in conventional safety valves; with the very short response time of the magnetorheological fluid, the present disclosure reduces the response time taken by spring action of conventional safety valves.

3. To further shorten the pilot valve's action response time, the present disclosure eliminates the reset spring structure as provided in the pilot valve core of conventional high flow safety valves. With a magnetically controlled shape memory alloy as the device for resetting the pilot valve core, the response time is further reduced.

4. In the present disclosure, the cracking pressure of the safety valve is set based on controller parameters, which provides a more accurate pressure control than conventional safety valves.

5. The safety valve according to the present disclosure is a pilot-operated safety valve. Compared with conventional magnetically controlled material safety valves and pressure relief valves, a larger valve core opening force can be provided with a smaller control force, thereby realizing a more reliable safety valve operation and a wider array of applications.

Figure 1:
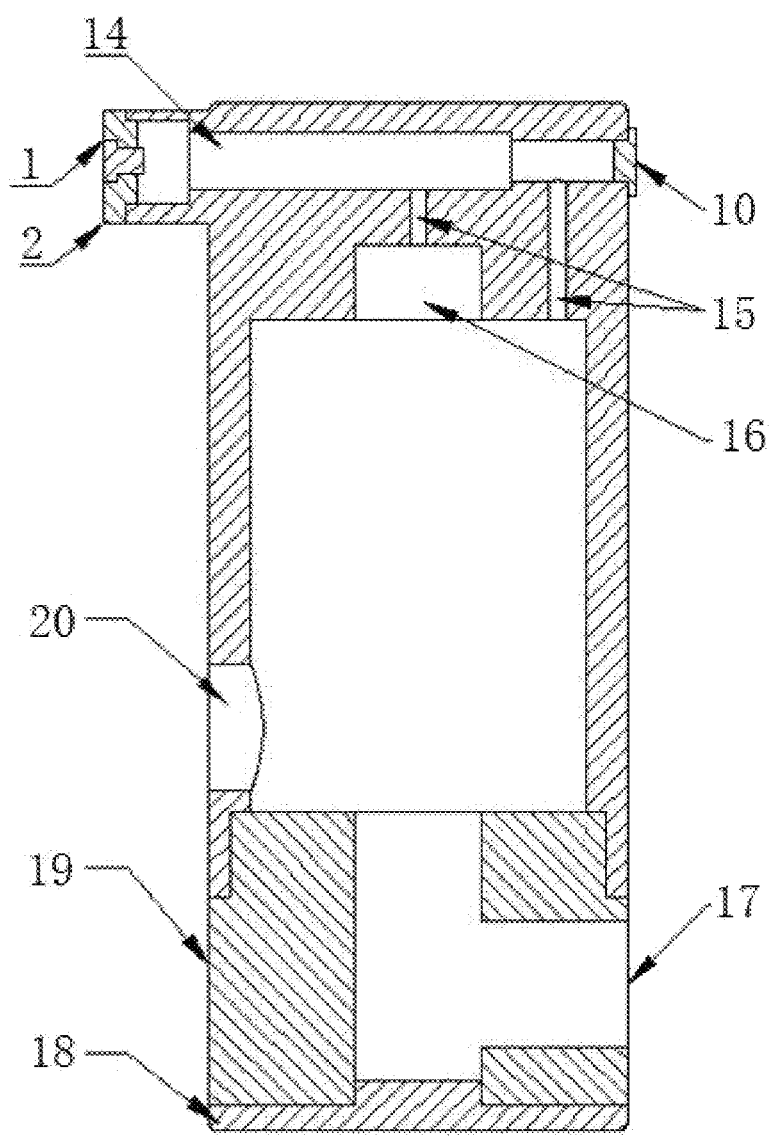
FIG. 1 is an overall view of the housing of a safety valve according to an embodiment of the present disclosure.

where 1—fine adjusting screw; 2—pilot valve end cap, 3—magnetically controlled material control coil, 4—push rod, 5—piston, 6—magnetorheological fluid control coil, 7—damping hole, 8—magnetorheological fluid, 9—pilot valve core, 10—plug, 11—magnetically controlled shape memory alloy, 12—coil lining, 13—displacement sensor, 14—pilot valve chamber, 15—control oil flow passageway, 16—spring chamber, 17—bleed port, 18—end cap, 19—valve seat, 20—fluid inlet, 21—spring chamber, 22—control oil flow passageway, 23—electromagnet, 24—reset spring, 25—housing.

DETAILED DESCRIPTION

Hereinafter, the present disclosure will be described in further detail through embodiments with reference to the accompanying drawings, but is not limited thereto.

Embodiment 1

As shown in FIGS. 1-6, a magnetically controlled material-based magnetorheological pilot operated safety valve for a hydraulic support is provided, comprising a valve body, a valve core, a reset spring, and a pilot valve; wherein the valve core is disposed in a valve core chamber provided in the valve body, the pilot valve is disposed in a pilot valve chamber provided in the valve body, the reset spring is disposed in a spring chamber provided in a spring chamber provided at the top end of the valve core and in a spring chamber provided in the valve body, the pilot valve chamber and the valve core chamber communicate therebetween via two control oil flow passageways, a magnetorheological fluid is filled in the pilot valve chamber, and an emulsion is filled in the valve core chamber;

the pilot valve includes a magnetically controlled shape memory alloy 11, an electromagnet 23, a push rod 4, a piston 5, a magnetorheological fluid control coil 6, and a pilot valve core 9, which are arranged sequentially from left to right; four magnetically controlled material control coils 3 are provided along the circumferential direction of the electromagnet 23; the magnetically controlled shape memory alloy 11 runs through the electromagnet 23, a front end of the magnetically controlled shape memory alloy 11 is connected to the push rod 4, the push rod 4 is connected to the piston 5, the magnetorheological fluid 8 lies between the piston 5 and the pilot valve core 9, and a damping hole 7 is provided in the axial direction of the magnetorheological fluid control coil 6.

The valve body comprises a housing 25, a valve seat 19, an end cap 18, and a plug 10; the bottom of the housing 25 is in threaded connection with the valve seat 19, a fluid inlet 20 is provided in the housing and communicates with the valve core chamber, the valve core chamber is disposed in a vertical direction of the housing, the pilot valve chamber 14 is disposed in a horizontal direction in the housing, one end of the pilot valve chamber 14 is enclosed by a pilot valve end cap 2, and the other end is enclosed by the plug 10, the bottom of the valve seat 19 is enclosed by the end cap 18, and a bleed port 17 communicating with the valve core chamber is provided on the valve seat 19.

Figure 2:
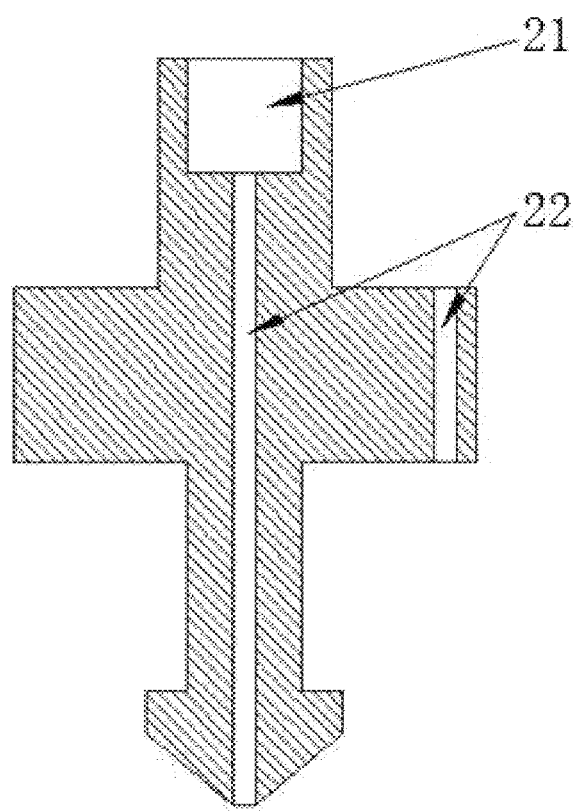
FIG. 2 is a structural diagram of a valve core according to an embodiment the present disclosure.
Figure 3:
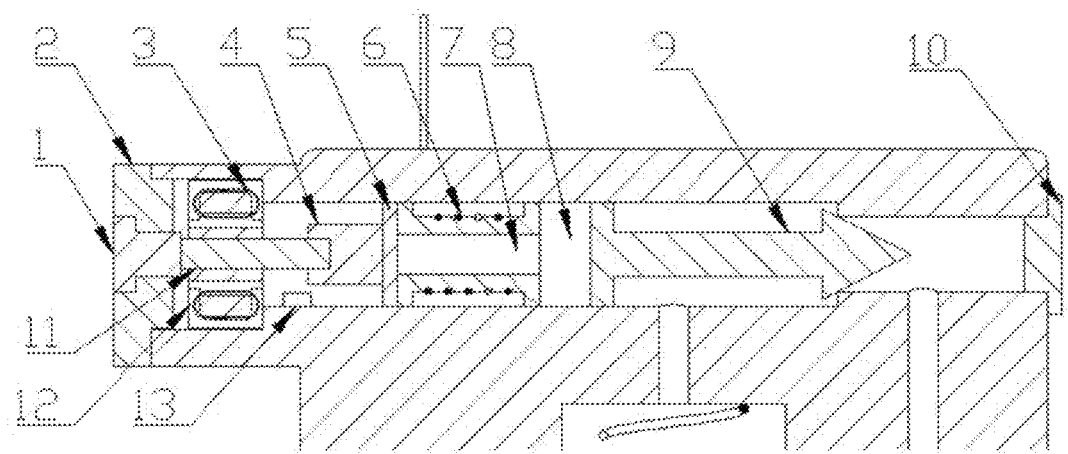
FIG. 3 is a structural diagram of a pilot valve according to an embodiment of the present disclosure.
Figure 4:
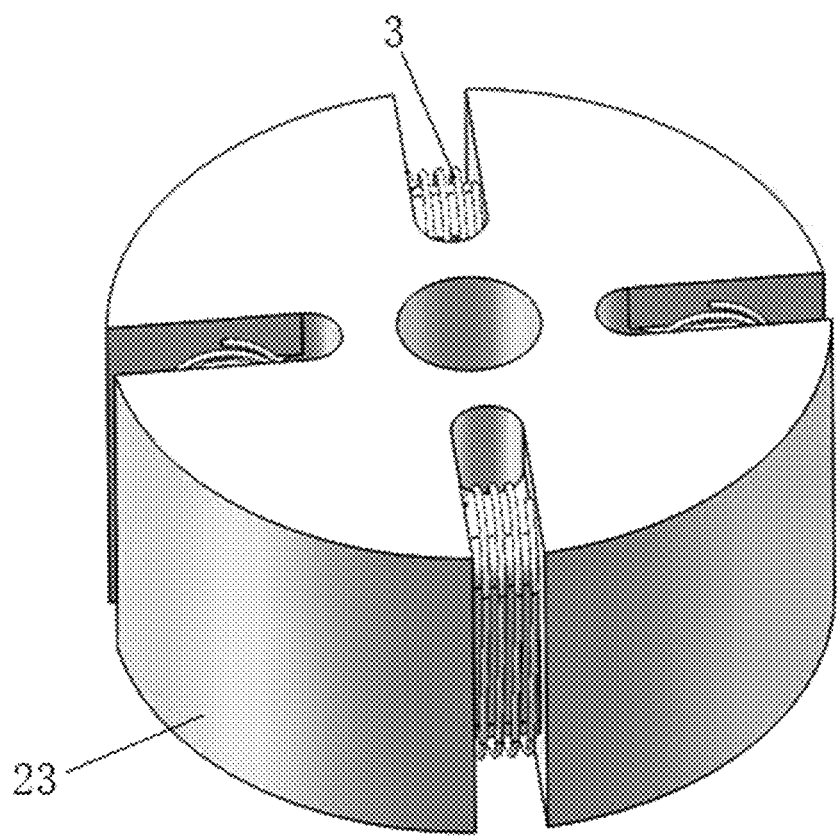
FIG. 4 is a structural diagram of a magnetically controlled material control coil according to an embodiment of the present disclosure.
Figure 5:
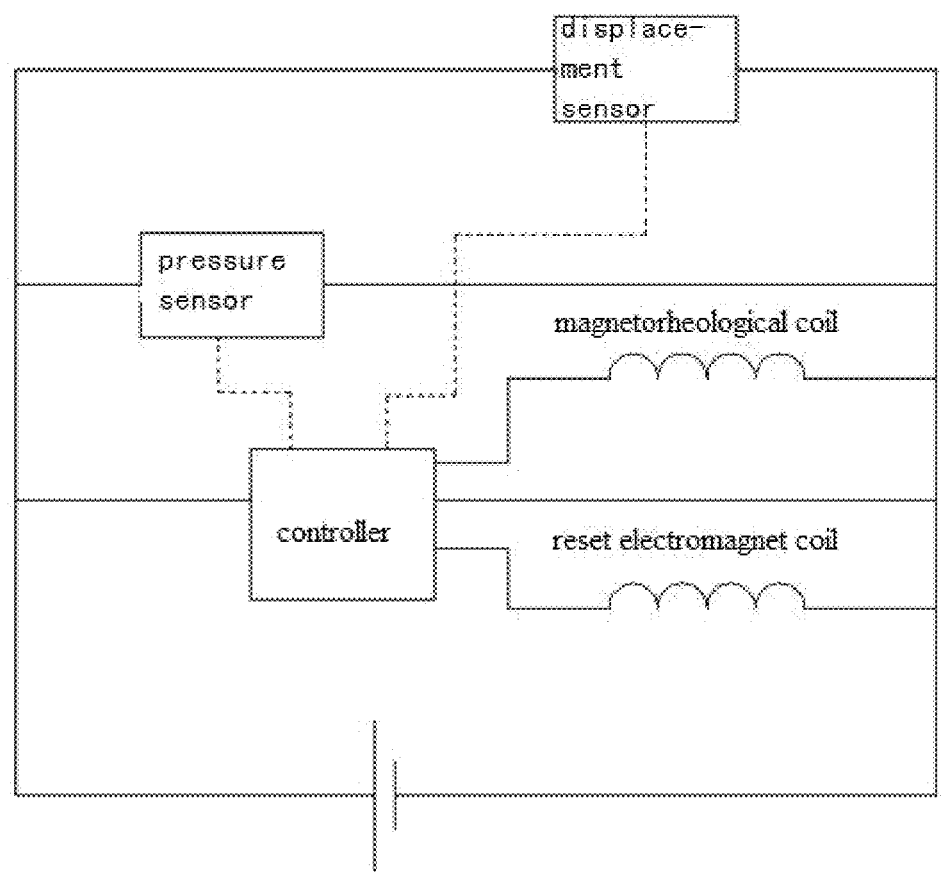
FIG. 5 is a principle diagram of electric control of a safety valve according to an embodiment of the present disclosure.
Figure 6:
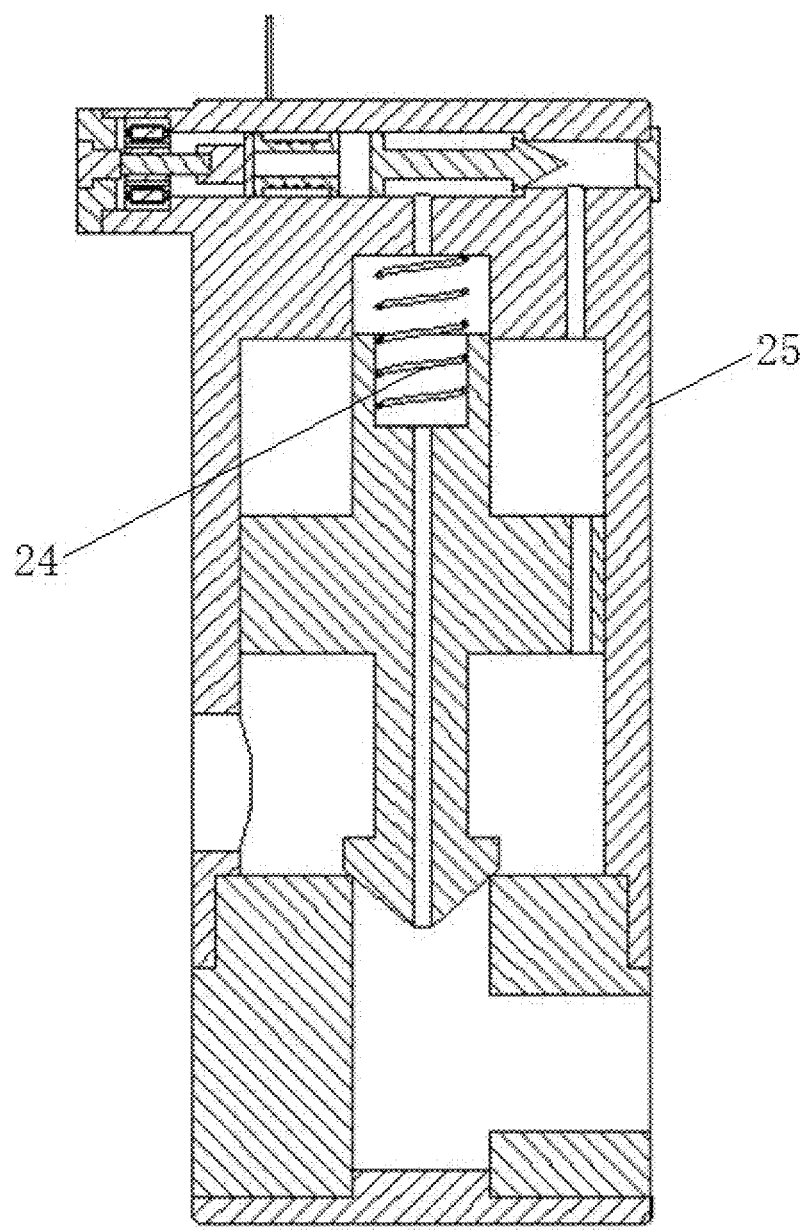
FIG. 6 is an overall structural diagram of a safety valve according to an embodiment the present disclosure.

As shown in FIG. 2, the valve core has a cross-shaped appearance, the spring chamber 21 is provided on the top of the valve core, and two through control oil flow passageways 22 (i.e., a third control oil flow passageway and a fourth control oil flow passageway) are provided in the axial direction of the valve core. The bottom of the valve core is provided as a conical body, such that when the valve core descends, the conical body may block the bleed port 17 on the valve seat 19.

The pilot valve end cap 2 is provided with a fine adjusting screw 1, the fine adjusting screw 1 contacting a terminal end of the magnetically controlled shape memory alloy 11, wherein an initial position of the magnetically controlled shape memory alloy 11 can be adjusted by turning the fine adjusting screw.

A displacement sensor 13 is mounted in the pilot valve chamber 14; the displacement sensor 13 is disposed at the piston 5 side, and the displacement sensor 13 is configured to detect a position of the piston 5 and transmit a signal to the controller.

The pilot valve chamber 14 is a step chamber, including a big compartment and a small compartment, two control oil flow passageways 15 (i.e., a first control oil flow passageway and a second control oil flow passageway) respectively communicating with the big compartment and the small compartment; one end of the pilot valve core 9 is provided as a conical body, the pilot valve core 9 being disposed in the big compartment, such that when the pilot valve core 9 moves, the conical body may block the small compartment.

The reset spring 24 selects a Belleville spring, disposed in a spring chamber 16 and a spring chamber 21; when the valve core moves upwards, the reset spring is compressed in the spring chamber 16 and the spring chamber 21 to accumulate energy, mainly playing a reset role after the main valve core of the safety valve acts.

Embodiment 2

A magnetically controlled material-based magnetorheological pilot operated safety valve for a hydraulic support is provided, the structure of which selects Embodiment 1, except that the reset spring 24 selects a rubber spring.

Embodiment 3

A magnetically controlled material-based magnetorheological pilot operated safety valve for a hydraulic support is provided, the structure of which selects Embodiment 1, except that the reset spring 24 selects a gas spring.

Embodiment 4

An operating method of a magnetically controlled material-based magnetorheological pilot operated safety valve for a hydraulic support is provided, the safety valve illustrated in Embodiment 1 being pre-mounted on an oil circuit for controlling a column of the hydraulic support; then a pressure pickup and a controller disposed in a middle cylinder of the column being connected to the safety valve; under the control of a controller, a magnetorheological fluid control coil 6 and a magnetically controlled material control coil 3 of the safety valve being currently in an energized state, the magnetorheological fluid 8 being in a non-Newtonian fluid state, the magnetically controlled shape memory alloy 11 being in a rightward elongated state, the displacement sensor 13 being connected with and controlled by a controller; wherein when the column is subjected to an impact pressure, the operating method of the safety valve comprises steps as follows:

(1) the pressure pickup detects a column impacted signal and transmits a measured pressure value S to the controller;

(2) the controller analyzes the impact pressure value S and compares the impact pressure value S with a preset value $S_0$, so as to determine whether the difference $\Delta S$ is within a pressure range setting $\Delta S_0$ and further determine whether a rockburst occurs;

(3) when the difference is less than the pressure range setting ($\Delta S < \Delta S_0$), the controller determines that the hydraulic support operates within a normal pressure range; the controller energizes the magnetorheological fluid control coil 6 and the magnetically controlled material control coil 3 according to set parameters; the magnetorheological fluid in the pilot valve is in the non-Newtonian fluid state and disposed at the right side of the magnetorheological fluid control coil 6, and the magnetically controlled shape memory alloy 11 continues a rightward elongation state; at this moment, the pilot valve core 9 does not act and the safety valve is in a closed state;

or, when the difference is greater than the pressure range setting ($\Delta S > \Delta S_0$), the controller determines that the hydraulic support receives the impact pressure; the controller controls the magnetorheological fluid control coil 6 to be deenergized and the magnetically controlled material control coil 3 to be reversely energized; the electromagnet 23 generates a reverse magnetic field to cause the magnetically controlled shape memory alloy 11 to be retracted leftward, the magnetorheological fluid 8 changes to a Newtonian fluid state and flows towards the left side of the magnetorheological fluid control coil 6; the pilot valve core 9 moves leftward, the safety valve is opened, the emulsion in the upper portion of the valve core returns through the pilot valve chamber 14 and the control oil flow passageways 22 on the valve core to an emulsion pump station; at this moment, under the pressure action of the emulsion in the lower portion of the valve core, the valve core overcomes the pressure of the reset spring to move upwards; the valve core is opened, and the emulsion in the column flows via a fluid inlet 20 and a bleed port back 17 back to the pump station;

(4) when the pressure pickup detects that middle cylinder pressure drops below the pressure range setting, the controller determines that the safety valve has completed bleeding; then, the controller controls the magnetically controlled material control coil 3 to be reversely energized for the second time, wherein the electromagnet resumes the rightward magnetic field to cause the magnetically controlled shape memory alloy 11 to be elongated rightward to push the piston 5 to move rightward; the piston 5 squeezes the magnetorheological fluid 8 to the right side of the magnetorheological fluid control coil 6 to close the pilot valve core 9;

(5) when the piston 5 reaches the rightmost end, the displacement sensor 13 detects a position change of the piston 5, and transmits a position signal to the controller; the controller controls the magnetorheological fluid control coil 6 to be energized, causing the magnetorheological fluid 8 to turn into the non-Newtonian fluid state and to be blocked in the right chamber; under this action, the pilot valve core 9 is pushed to the rightmost side to complete the reset;

(6) under the action of the reset spring, the valve core moves downwards such that the conical body at the bottom of the valve core blocks the bleed port 17 on the valve seat 19, thereby completing reset of the safety valve.

The invention claimed is:

1. A magnetically controlled material-based magnetorheological pilot operated safety valve for a hydraulic support, comprising a valve body, a valve core, a reset spring, and a pilot valve; wherein the valve core is disposed in a valve core chamber provided in the valve body, the pilot valve is disposed in a pilot valve chamber provided in the valve body, the reset spring is disposed in a spring chamber provided at the top end of the valve core and in a spring chamber provided in the valve body, the pilot valve chamber and the valve core chamber communicate there between via a first control oil flow passageway and a second control oil flow passageway, a magnetorheological fluid is filled in the pilot valve chamber, and an emulsion is filled in the valve core chamber;

the pilot valve includes a magnetically controlled shape memory alloy, an electromagnet, a push rod, a piston, a magnetorheological fluid control coil, and a pilot valve core, which are arranged sequentially from left to right; a plurality of magnetically controlled material control coils are provided on the electromagnet; the magnetically controlled shape memory alloy runs through the electromagnet, a front end of the magnetically controlled shape memory alloy being connected to the push rod; the push rod is connected to the piston, the magnetorheological fluid lies between the piston and the pilot valve core, and a damping hole is provided in the axial direction of the magnetorheological fluid control coil.

2. The magnetically controlled material-based magnetorheological pilot operated safety valve for a hydraulic support according to claim 1, wherein the valve body comprises a housing, a valve seat, an end cap, and a plug; the housing is disposed on the valve seat, a fluid inlet being provided in the housing and communicating with the valve core chamber; the valve core chamber is disposed in a vertical direction of the housing; the pilot valve chamber is disposed in a horizontal direction in the housing, one end of the pilot valve chamber being enclosed by a pilot valve end cap, and the other end being enclosed by the plug; the bottom of the valve seat is enclosed by the end cap of the valve body; and a bleed port communicating with the valve core chamber is provided on the valve seat.

3. The magnetically controlled material-based magnetorheological pilot operated safety valve for a hydraulic support according to claim 2, wherein the bottom end of the valve core is provided as a conical body, such that when the valve core descends, the conical body blocks the bleed port on the valve seat.

4. The magnetically controlled material-based magnetorheological pilot operated safety valve for a hydraulic support according to claim 2, wherein the pilot valve end cap is provided with a fine adjusting screw, the fine adjusting screw contacting a terminal end of the magnetically controlled shape memory alloy.

5. The magnetically controlled material-based magnetorheological pilot operated safety valve for a hydraulic support according to claim 2, wherein the bottom of the housing is in threaded connection with the valve seat.

6. The magnetically controlled material-based magnetorheological pilot operated safety valve for a hydraulic support according to claim 1, wherein the valve core has a cross-shaped appearance, one of the spring chambers is provided at the top end of the valve core, and a third through control oil flow passageway and a fourth through control oil flow passageway are provided in the axial direction of the valve core.

7. The magnetically controlled material-based magnetorheological pilot operated safety valve for a hydraulic support according to claim 1, wherein a displacement sensor is provided in the pilot valve chamber, the displacement sensor being disposed at the piston side.

8. The magnetically controlled material-based magnetorheological pilot operated safety valve for a hydraulic support according to claim 1, wherein the pilot chamber is a step chamber, including a big compartment and a small compartment, the first control oil flow passageway and the second control oil flow passageway respectively communicating with the big compartment and the small compartment; one end of the pilot valve core is provided as a conical body, the pilot valve core being disposed in the big compartment, such that when the pilot valve core moves, the conical body blocks the small compartment.

9. The magnetically controlled material-based magneto-rheological pilot operated safety valve for a hydraulic support according to claim 1, wherein the reset spring selects a Belleville spring, a rubber spring, or a gas spring.

* * * * *